United States Patent
Marger et al.

(10) Patent No.: US 12,291,321 B2
(45) Date of Patent: May 6, 2025

(54) PROPELLER BLADE PITCH CHANGE ACTUATION SYSTEM

(71) Applicant: Ratier-Figeac SAS, Figeac (FR)

(72) Inventors: Thibaut Marger, Beduer (FR);
Romain Bouloc, Saint-Félix (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 17/988,325

(22) Filed: Nov. 16, 2022

(65) Prior Publication Data
US 2023/0159155 A1    May 25, 2023

(30) Foreign Application Priority Data

Nov. 22, 2021 (EP) .................................. 21290076

(51) Int. Cl.
*B64C 11/38* (2006.01)
*B64C 27/64* (2006.01)

(52) U.S. Cl.
CPC .............. *B64C 11/38* (2013.01); *B64C 27/64* (2013.01)

(58) Field of Classification Search
CPC ......... B64C 11/38; B64C 11/40; B64C 11/42; B64C 27/64
See application file for complete search history.

(56) References Cited

U.S. PATENT DOCUMENTS

| 2,807,327 | A | | 9/1957 | Scott |
| 3,261,406 | A | * | 7/1966 | Goodman ........... B64C 29/0091 416/157 R |
| 4,523,891 | A | | 6/1985 | Schwartz et al. |
| 5,431,539 | A | | 7/1995 | Carvalho |
| 6,077,040 | A | | 6/2000 | Pruden et al. |
| 6,439,850 | B1 | * | 8/2002 | McCallum ........... F04D 29/063 416/144 |
| 10,793,255 | B2 | | 10/2020 | Miszkiewicz |

FOREIGN PATENT DOCUMENTS

| CH | 246413 A | 12/1946 |
| GB | 517372 A | 1/1940 |

OTHER PUBLICATIONS

European Search Report for Application No. 21290076.5, mailed Apr. 28, 2022, 11 pages.

* cited by examiner

*Primary Examiner* — Michael K. Reitz
(74) *Attorney, Agent, or Firm* — CANTOR COLBURN LLP (57) ABSTRACT

A pitch change actuation system for varying a propeller blade pitch includes: an actuator body defining an interior volume; and a chamber separator located within the interior volume of the actuator body and dividing the interior volume into a first chamber and a second chamber, the two chambers being fluidly separated by the chamber separator. The first and second chambers are configured to receive hydraulic fluid. The actuator body is configured to translate relative to the chamber separator in response to a difference in hydraulic pressure between the first chamber and second chamber; and the translation of the actuator body is configured to effect a change in propeller blade pitch.

16 Claims, 2 Drawing Sheets

PROPELLER BLADE PITCH CHANGE ACTUATION SYSTEM

CROSS-REFERENCE TO RELATED APPLICATIONS

This application claims priority to European Patent Application No. 21290076.5 filed Nov. 22, 2021, the entire contents of which is incorporated herein by reference.

TECHNICAL FIELD

The present disclosure relates to a pitch change actuation system for varying a propeller blade pitch.

BACKGROUND OF THE INVENTION

Propellers, for example aircraft propellers, typically comprise a plurality of blades fixed to a rotating propeller hub. Variable-pitch propellers are provided with a pitch change system that enables the blade pitch of each blade to be controlled. Variable-pitch propeller blades allow the angle of attack of the blade relative to the oncoming airflow to be varied. For example, the blade pitch can be adjusted from a feather position (with the blades parallel to the oncoming airflow—minimum thrust/drag) to a reverse position that may provide reverse thrust.

Propeller pitch change systems commonly use hydraulic actuation systems to control the pitch of the propeller blades. A typical hydraulic actuator comprises an hydraulic piston that is located axially forward of the propeller blade plane and housed within a piston sleeve. A cover is usually provided at a forward-most end such that a first chamber is formed between the cover, sleeve and piston and a second chamber is formed between the sleeve and piston, the piston separating the chambers. A transfer tube usually extends from the piston chambers axially aftward to a hydraulic fluid source such that hydraulic fluid can be supplied to the first and second chambers.

A controller controls the hydraulic fluid flow to selectively supply hydraulic fluid to the chambers depending on the desired blade pitch angle. The difference in hydraulic pressure between the two hydraulic chambers causes the piston to axially translate. Coupled to the piston is usually a piston shaft that extends aftwards towards the propeller blade plane and proximate to the propeller blades a pitch change kinematic couples the shaft to the propeller blades. This allows the pitch of the propeller blades to be varied by varying hydraulic flow and pressure within the two chambers.

Existing propeller pitch change actuation systems can be time consuming to maintain and are at risk of pollutants being introduced into the piston chamber if the cover is removed to perform maintenance. Furthermore, existing pitch change actuation systems can be heavy and complex.

There therefore remains a need for an improved design of a pitch change actuation system for controlling propeller blade pitch.

SUMMARY

According to a first aspect, there is provided a pitch change actuation system for varying a propeller blade pitch, the pitch change actuation system comprising: an actuator body defining an interior volume; a chamber separator located within the interior volume of the actuator body and dividing the interior volume into a first chamber and a second chamber, the two chambers being fluidly separated by the chamber separator; wherein the first and second chambers are configured to receive hydraulic fluid; wherein the actuator body is configured to translate relative to the chamber separator in response to a difference in hydraulic pressure between the first chamber and second chamber; and wherein the translation of the actuator body is configured to effect a change in propeller blade pitch.

The translation of the actuator body may be a linear movement along a longitudinal axis of the pitch change actuation system. Therefore, where "axially" is referred to, this will be understood as relating to this longitudinal axis. It will be well understood by the skilled person that the longitudinal axis of the pitch change actuation system extends in a direction from forward to aft. That is, the actuator body may move forward and aft along a longitudinal axis.

It will be appreciated that relative positional terms such as "forward" and "aft" are with reference to the normal operational attitude of the pitch change actuation system. The pitch change actuation system may be installable in a propeller assembly of an aircraft, the propeller assembly being driven by an engine shaft.

It can be understood that an aft end of the pitch change actuation system may be towards the engine shaft and the forward end may be away from said engine shaft. By way of further example, an aircraft will have a forward (i.e. front) end, and an aft (i.e. rear) end. In the case of an aircraft having a tractor propeller configuration (i.e. the propeller pulling the aircraft) the forward end of the pitch change actuation system is towards the front of the aircraft when installed thereon. In this case, the forward and aft end of the pitch change actuation system is in correlation with the forward and aft ends of an aircraft in which it is installable. Conversely, in the case of an aircraft having a pusher propeller configuration (i.e. the propeller pushing the aircraft) the forward end of the pitch change actuation system is towards the rear of an aircraft when installed thereon. In either a tractor or pusher configuration of the propeller the aft end of the pitch change actuation system is towards the engine shaft, i.e. the shaft that drives the propeller.

The actuator body, responsive to the difference in hydraulic pressure between the first chamber and second chamber, may be configured to translate between a first position and a second position. In the first position the second chamber may have a minimum volume and the first chamber may have a maximum volume. In the second position the first chamber may have a minimum volume and the second chamber may have a maximum volume. One of the first and second actuator body positions may correspond to the provision of a reverse propeller blade pitch, with the other of the actuator body positions corresponding to the provision of a feathering propeller blade pitch, and intermediary actuator body positions corresponding to the provision of intermediary propeller blade pitches.

The first chamber may be known as the decrease pitch chamber, wherein an increase in volume of the first chamber corresponds to a translation of the actuator body that causes the pitch of the blades to decrease, i.e. to cause the pitch to become finer. Conversely, the second chamber may be known as the increase pitch chamber, wherein an increase in volume of the second chamber corresponds to a translation of the actuator body that causes the pitch of the blades to increase, i.e. to cause the pitch to become coarser and move towards the feather position. Therefore, the first actuator body position (i.e. in which the first chamber has a maximum volume) may correspond to a reverse propeller blade pitch. The second actuator body position (i.e. in which the second chamber has a maximum volume) may correspond to a feathering propeller blade pitch. Intermediary actuator body positions between the first and second actuator body position may correspond to intermediary propeller blade pitches.

Alternatively, the first chamber may be an increase pitch chamber, wherein an increase in volume of the first chamber corresponds to a translation of the actuator body that causes the pitch of the blades to increase, i.e. to cause the pitch to become coarser and move towards the feather position. Conversely, the second chamber may be a decrease pitch chamber, wherein an increase in volume of the second chamber corresponds to a translation of the actuator body that causes the pitch of the blades to decrease, i.e. to cause the pitch to become finer. Therefore, the first actuator body position (i.e. in which the first chamber has a maximum volume) may correspond to a feathering propeller blade pitch. The second actuator body position (i.e. in which the second chamber has a maximum volume) may correspond to a reverse propeller blade pitch. Intermediary actuator body positions between the first and second actuator body position may correspond to intermediary propeller blade pitches.

The first position of the actuator body may be an axially forward most position and the second position of the actuator body may be an axially aftward most position. The first chamber may be an axially forward most chamber and the second chamber may be an axially aftmost chamber.

The chamber separator may not translate in response to a difference in hydraulic pressure between the chambers. In other words it may be configured to be axially static with respect to a propeller hub in which the pitch change actuation system may be installed. The chamber separator may be in the form of a piston. This may be termed a fixed piston, e.g. because it does not translate in response to a difference in hydraulic pressure between the chambers, it is configured to be axially static with respect to a propeller hub in which the pitch change actuation system may be installed. The piston may take any typical known form, such as for example a substantially cylindrical segment. The actuator body may be considered as a piston sleeve. The chamber separator may be a yoke.

The actuator body may be configured to intersect a plane of the propeller blade(s) of a propeller assembly in which it is installable. In other words, the actuator body may be configured to intersect a plane of the propeller blade(s) when assembled in a propeller blade assembly. In other words, the pitch change actuation system may be configured, for example positionable in a propeller hub, such that the actuator body intersects a plane of blade(s) the pitch of which the pitch change actuation system varies. The pitch change actuation system may be configured such that the actuator body intersects a plane of the propeller blade at all times regardless of translation in response to a difference in hydraulic pressure.

Put another way, the actuator body may be configured to be located at least partially within a propeller blade plane. In other words, the actuator body may be configured to be located at least partially within a plane of blade(s) the pitch of which the pitch change actuation system varies.

The pitch change actuation system may comprise a shaft, for example a rod. This may extend axially from the chamber separator. It may extend axially in both forward and aft directions. The actuator body may be configured to translate with respect to the shaft. The actuator body may be configured to translate in a longitudinal direction of the shaft. The actuator body may be configured to translate along the shaft. The actuator body may be slidably engaged with the shaft. The actuator body may be slidably mounted on the shaft. The actuator body may slidably translate along the shaft with respect to the chamber separator. The shaft may extend axially from the chamber separator in a forward direction, an aft direction, or both.

The chamber separator and shaft may not be moveable with respect to each other, e.g. are in a fixed positional relationship. The chamber separator may be fastened to the shaft. The chamber separator and shaft may be integral with one another. The chamber separator may comprise a seal about its circumference to prevent hydraulic leakage between the first and second chambers. The seal may be a glide seal, slide ring, O-ring seal, an O-ring in combination with a back-up ring. The seal may be a dynamic seal. The seal may comprise a plurality of seals.

The shaft may extend through the first and/or second chambers. The chamber separator may be located at an axial mid-portion of the shaft.

The actuator body may comprise an aperture at an end of the actuator body and the shaft may extend through the aperture. The aperture may be a forward aperture at an axially forward end of the actuator body. The aperture may comprise a seal configured to prevent hydraulic leakage from within the actuator body.

The shaft may be configured to abut a propeller blade hub cover or other component of a propeller hub at an axially forward end of the shaft. The shaft may be configured to engage with a hub cover.

The shaft may be configured to be held axially static e.g. with respect to a propeller blade hub cover or other component of the propeller hub. The shaft may be configured to be fastened to a propeller hub cover. The shaft may be configured to receive a nut to fasten the shaft to the propeller hub cover.

The pitch change actuation system may comprise a transfer tube. The transfer tube may be coupled to the actuator body. A portion of the transfer tube may be received within the actuator body. The transfer tube may be configured to provide hydraulic fluid to the first and second chambers. The pitch change actuation system may comprise one or more fluid passageways to supply hydraulic fluid from the transfer tube to the first and/or second chambers.

The actuator body may comprise a coupling for coupling the transfer tube to the actuator body. The coupling may be configured to prevent relative axial displacement between the actuator body and transfer tube and prevent relative rotation between the actuator body and the transfer tube about a longitudinal axis of the pitch change actuation system. The coupling may be configured to allow the transfer tube to rotate about axes perpendicular to the longitudinal axis.

The coupling may be a soft coupling for receiving the transfer tube. The soft coupling may be configured to allow a limited number of degrees of freedom between the transfer tube and actuator body. The soft coupling may prevent relative axial displacement between the actuator body and the transfer tube and prevent relative rotation between the actuator body and the transfer tube about a longitudinal axis of the pitch change actuation system; but allow other degrees of freedom for example rotational movement about axes perpendicular to the longitudinal axis. Deflection may also be accommodated, e.g. such that instances where an axis of the actuator body and an axis of the transfer tube are not parallel can be accommodated. The soft coupling may be in the form of a ball joint.

The transfer tube may translate with the actuator body.

The shaft may comprise an interior fluid passageway configured to fluidly couple at least one of the first and second chambers to the transfer tube. The shaft may comprise fluid outlets to provide fluid from the interior fluid passageway to at least one of the first and second chambers.

The shaft may comprise one or more fluid outlets at a position axially forward of the chamber separator to fluidly couple the first chamber to the interior passageway. The shaft may comprise fluid outlets at a position axially aft of the chamber separator to fluidly couple the second chamber to the interior passageway.

The actuator body may comprise a fluid passageway that extends from the transfer tube to the first or second chamber such that the transfer tube and the first or second chamber are in fluid communication, in other words are fluidly coupled.

The interior passageway of the shaft may fluidly couple the first chamber to the transfer tube and the actuator body fluid passageway may fluidly couple the second chamber to the transfer tube. Alternatively, the interior passageway of the shaft may fluidly couple the second chamber to the transfer tube and the actuator body fluid passageway may fluidly couple the first chamber to the transfer tube.

The transfer tube may comprise one or more inlets configured to fluidly couple with one or more outlets of a transfer tube receiving component. The transfer tube may comprise two hydraulic fluid flow paths. The hydraulic fluid flow paths may be in communication with the one or more inlets. The first hydraulic fluid flow path of the transfer tube may be in fluid communication with the interior passageway of the shaft. The second hydraulic flow path of the transfer tube may be in fluid communication with the actuator body fluid passageway.

The pitch change actuation system may be configured to be installed and/or uninstalled at least partially within a propeller hub of a propeller assembly as a single module. In other words, the pitch change actuation system may be configured to be replaceable as a single unit. That is, the components forming the pitch change actuation system, for example the actuator body, chamber separator and transfer tube, may be configured to be inserted or removed as one assembly into or out of a propeller assembly. By way of further example, the transfer tube is not uncoupled from the actuator body to remove the pitch change actuation system from a propeller assembly.

In an embodiment, the pitch change actuation system may be a line replaceable unit (LRU). If the pitch change actuation system is an LRU then no further rigging is required between the actuator body and the transfer tube.

Translation of the actuator body is configured to effect a change in propeller blade pitch. This may be by the actuator body being configured to engage with a propeller blade pitch kinematic. For example, the actuator body may comprise a flange extending radially outwards of an outer surface of the actuator body. The flange may be for mechanically coupling the actuator body to a propeller blade pitch kinematic. In other words, the flange may extend radially outwards of the surface not defining the interior volume. The flange may be configured to receive a fastener to mechanically couple the actuator body to a propeller blade pitch kinematic. The flange may be configured to be received within a slot of the propeller blade pitch kinematic. The flange may comprise two flange portions which are configured to receive the propeller blade pitch kinematic therebetween.

The flange may be a circumferential flange, e.g. extending annularly around the actuator body. The flange may be configured to receive a fastener such as a threaded bolt. The flange may comprise an aperture to receive a fastener. The flange may comprise a plurality of apertures to receive a plurality of fasteners. The pitch change actuation system may comprise a fastener installed in the flange, the fastener and flange may be configured to mechanically couple a propeller blade pitch kinematic to the actuator body. The pitch change actuation system may comprise a plurality of fasteners installed in the flange, the fasteners and flange may be configured to mechanically couple a plurality of propeller blade pitch kinematics to the actuator body.

The propeller blade pitch kinematic may be an eccentric roller, a crank shaft and cam, roller and plate/bearing or other suitable mechanisms for converting linear motion into rotational motion as is known in the art. In other words, the propeller blade pitch kinematic may be any suitable mechanism for converting the translational motion of the actuator body to a rotational motion at the propeller blade root. Accordingly, axial translation of the actuator body directly corresponds to a change in pitch of the propeller blade.

The chamber separator may be located at an axial position between an axial position of the radially extending flange when the actuator body is in the first actuator body position and an axial position of the radially extending flange when the actuator body is in the second actuator body position. The chamber separator may be located at an axial position between an axially forwardmost position of the radially extending flange and an axially aftmost position of the radially extending flange.

The actuator body may comprise a first actuator body portion and a second actuator body portion. The first and second actuator body portions may be coupled together to define the interior volume. The first and second actuator body portions may each comprise a flange. The first actuator body portion and the second actuator body portion may be fastened to one another via at least one fastener extending through the flanges of the first and second actuator body portions.

The first actuator body portion may be a forward actuator body portion and the second actuator body portion may be an aft actuator body portion. The forward actuator body portion flange may be at a location proximate the aft end of the forward actuator body portion. The aft actuator body portion flange may be at a location proximate the forward end of the aft actuator body portion. The forward actuator body portion and the aft actuator body portion may be fastened to one another via at least one fastener extending through the forward actuator body portion flange and the aft actuator body portion flange.

According to a second aspect, a propeller assembly is provided comprising: a propeller hub; a propeller blade mounted to the propeller hub; and a pitch change actuation system as described above.

The pitch change actuation system may be configured to receive hydraulic fluid from a hydro-mechanical power and control assembly.

The actuator body may intersect a plane of the propeller blade. Put another way, the actuator body may be located at least partially within a plane of the propeller blade. The actuator body may intersect a plane of the propeller blade at all times regardless of translation in response to a difference in hydraulic pressure.

A portion of the actuator body may be configured to translate through a plane of the propeller blade in response to the difference in hydraulic pressure.

The actuator body, responsive to the difference in hydraulic pressure between the first chamber and second chamber, may be configured to translate between a first position and a second position. In the first position the second chamber may have a minimum volume and the first chamber may have a maximum volume. In the second position the first chamber may have a minimum volume and the second chamber may have a maximum volume. The pitch change actuation system may be positioned in the propeller hub such that during translation between the first and second actuator body positions, there is a position of the actuator body in which at least one of the chambers has a portion intersecting the blade plane.

The plane of the propeller blade (or the "propeller blade plane") may be defined as a plane that extends perpendicular to the longitudinal axis of the pitch change actuation system at an axial position corresponding to the axial position of the centreline of propeller blade retention, i.e. the axis of blade pitch rotation.

The pitch change actuation system may be at least partially installed within the propeller hub. A hub cover may be provided to cover an axially forward end of the hub. The hub cover may therefore seal the hub. The hub cover may be integral with the propeller hub. The hub cover may be screwed to the hub. The hub cover may be a separate component to the pitch change actuation system. The hub cover may therefore not form part of the actuator body. The shaft may abut or otherwise engage with the propeller hub cover. The hub cover may be coupled to the shaft.

The actuator body is configured to translate relative to the chamber separator. The chamber separator may be considered to be static with respect to the propeller hub in which the pitch change actuation system is installed. Therefore the actuator body may be considered to translate with respect to the propeller hub.

The propeller assembly may comprise a longitudinal axis about which propeller blade(s) are mounted, i.e. an axis of propeller rotation. This may be termed the centreline of the propeller assembly. The actuator body may translate along this longitudinal axis of the propeller assembly. The actuator body may translate perpendicular to the propeller blade(s).

The propeller assembly may comprise a propeller blade pitch kinematic, for example as described previously above. The actuator body may be engaged with the propeller blade pitch kinematic. The actuator body may comprise a flange extending radially outwards of an outer surface of the actuator body. The flange may be coupled, e.g. fastened, to the propeller blade pitch kinematic. The propeller blade pitch kinematic may be coupled to a root of the propeller blade, optionally via a blade root pin. Therefore translation of the actuator body will cause translation of the kinematic, which converts the translational motion into rotation of the blade root coupled thereto.

It will be appreciated that although the propeller assembly has been described in relation to one propeller blade, typically the propeller assembly will comprise multiple propeller blades and the pitch change actuation system varies the pitch of the multiple propeller blades. Each propeller blade may have an associated propeller blade pitch kinematic for example as described above. The actuator body may be engaged with each propeller blade pitch kinematic, optionally via a flange of the actuator body that is coupled to each of the propeller blade pitch kinematics.

The propeller assembly may form part of a propeller system. Thus there is also provided a propeller system comprising the propeller assembly and a hydro-mechanical power and control assembly.

The hydro-mechanical power and control assembly may be mounted on a static part of the propeller system, for example the part comprising an engine. The hydro-mechanical power and control assembly may comprise multiple components located at different parts of the static part of the propeller system or aircraft to which it is mounted. The multiple components may be interconnected. The hydro-mechanical power and control assembly may comprise a hydraulic fluid reservoir or may be configured to receive hydraulic fluid from the engine side of the aircraft.

Where "static" is used herein, it will be appreciated that this is intended to differentiate from a rotary part of the propeller system. Of course, a vehicle having the propeller system may be moving and thus the "static" part of the propeller assembly will be moving with the vehicle and not truly static (stationary).

The propeller system may include a transfer tube receiving component configured to receive an end of the transfer tube. The end received in the transfer tube receiving component may be the opposite end to that coupled to the actuator body. The transfer tube receiving component may be configured to receive the transfer tube via an aperture. The transfer tube receiving component may be configured to receive the transfer tube without requiring fasteners. The transfer tube receiving component may be configured to receive hydraulic fluid from the hydro-mechanical power and control assembly and supply it to the transfer tube.

The transfer tube receiving component may be a component of the hydro-mechanical power and control assembly. The transfer tube receiving component may be configured to supply the hydraulic fluid to the first hydraulic fluid flow path and the second hydraulic fluid flow path of the transfer tube to create a desired pressure differential between the first and second chamber of the interior volume of the actuator body. The transfer tube receiving component may be configured to supply the hydraulic fluid to the first hydraulic fluid flow path and the second hydraulic fluid flow path responsive to a control input from a propeller electronic control unit which may be part of the hydro-mechanical power and control assembly. The propeller assembly may comprise such a propeller electronic control unit located on a static part of the propeller assembly. The transfer tube receiving component may comprise one or more outlets that fluidly couple with one or more inlets of the transfer tube.

The propeller system may include a sensor configured to detect the axial position of the transfer tube to determine the actuator body position and hence the propeller blade pitch. A plurality of sensors may be provided. The sensor(s) may include at least one of a Rotary Variable Differential Transformer (RVDT) sensor, a Linear Variable Differential Transformer (LVDT) sensor, a hall effect sensor, or a proximity sensor.

The sensor may be mounted to a static portion of the propeller system. The sensor may be installed proximate an aft end of the transfer tube. The sensor may be configured to measure the position of the transfer tube relative to the static portion of the propeller system.

The sensor may be configured to send data indicating the transfer tube position to the hydro-mechanical power and control assembly. The hydro-mechanical power and control assembly may be configured to determine the current propeller blade pitch angle based on the axial position of the transfer tube. The hydro-mechanical power and control assembly may be configured to compare the current propeller blade pitch angle to a desired propeller blade pitch angle and adjust the flow and pressures of the hydraulic fluid provided to the first and second chambers accordingly.

The propeller assembly may be mounted to an aircraft. The propeller system may be mounted to an aircraft. Thus there is also provided an aircraft comprising the propeller assembly as described above. An aircraft is also provided comprising the propeller assembly as described above and a hydro-mechanical power and control assembly, or the aircraft may comprise the propeller system as described above.

According to a third aspect, a method of installing a pitch change actuation system as described above in a propeller assembly is provided, the method comprising inserting the pitch change actuation system into the propeller hub.

The method may comprise inserting, optionally sliding, the pitch change actuation system into the propeller hub as a single integrated module.

The method may comprise removing a propeller hub cover of a propeller assembly prior to inserting the pitch change actuation system into the propeller hub. The pitch change actuation system may be inserted from a forward end. The propeller hub cover may be subsequently reinstalled.

The method may further comprise fastening a nut to the shaft of the pitch change actuation system to secure the shaft to the propeller hub cover.

The method may comprise inserting the pitch change actuation system into the propeller hub from an aft end of the propeller hub, for example, when a propeller hub cover is an integral component of the propeller hub.

The method may comprise coupling a flange of the actuator body to a propeller blade pitch kinematic. Optionally the coupling may comprise fastening with at least one fastener.

The method may further comprise mounting a propeller blade hub cover over the pitch change actuation system. Preferably the hub cover is screwed to the hub. The hub cover may be coupled to the shaft. The method may comprise fastening a nut to the shaft of the pitch change actuation system such that the shaft is fastened to the hub cover. The hub cover may seal the hub.

Installing a pitch change actuation system in a propeller assembly may include inserting an end of the transfer tube into a transfer tube receiving component of the propeller assembly. The transfer tube may be slid into the transfer tube receiving component. The transfer tube may be rotatable within the transfer tube receiving component. The transfer tube receiving component may be configured to supply hydraulic fluid into the transfer tube when the transfer tube is received. Inserting the transfer tube into the transfer tube receiving component may comprise axially inserting the transfer tube into an aperture of the transfer tube receiving component and may not require any fasteners.

Installing a pitch change actuation system in a propeller assembly may include locating the actuator body at least partially within a plane of the blade(s) of the propeller assembly. Installing a pitch change actuation system in a propeller assembly may include locating the actuator body to intersect a plane of the propeller blade(s).

Installing a pitch change actuation system in a propeller assembly may include aligning the flange of the actuator body with the propeller blade pitch kinematic.

Installing a pitch change actuation system in a propeller assembly may include aligning the shaft of the pitch change actuation system such that a nut can be fastened thereto to secure the shaft to the propeller blade hub cover.

Also disclosed is a method of controlling the blade pitch of a variable pitch propeller utilising the pitch change actuation system as described above.

According to a fourth aspect, a method of controlling the blade pitch of a variable pitch propeller is provided, the method comprising: varying the difference in hydraulic pressure acting on either side of a chamber separator such that an actuator body enclosing the chamber separator translates relative to the chamber separator, wherein the translation of the actuator body effects a change in propeller blade pitch.

The method may include providing hydraulic fluid to either side of the chamber separator via a transfer tube.

The actuator body may translate along a shaft that extends axially from the chamber separator. The actuator body may slidably translate along the shaft.

Optionally, at least a portion of the actuator body may translate through a plane of the propeller blade(s). A chamber may be provided on each side of the chamber separator. One of the chambers may be configured to translate through the blade plane in response to the difference in hydraulic pressure.

The method may include retaining the chamber separator in an axially fixed position relative to a propeller assembly having the variable pitch propeller.

The method may include providing hydraulic fluid from the transfer tube to a first chamber bounded by the actuator body and chamber separator via an interior passageway of a shaft that extends from the chamber separator. The method may include providing hydraulic fluid from the transfer tube to a second chamber bounded by the actuator body and chamber separator via an interior passageway of the actuator body.

The method may include translating the actuator body and transfer tube together.

The method may include sensing the translation of the actuator body. The method may include sensing translation of the transfer tube. Based on the translation of the actuator body or the transfer tube the method may comprise calculating the corresponding propeller blade pitch.

The method may include comparing the current propeller blade pitch to a desired propeller blade pitch and varying the flow and pressures of hydraulic fluid within the first and second chambers accordingly to achieve the desired propeller blade pitch.

The method of the fourth aspect may be performed by providing and/or using the pitch change actuation system of the first aspect, the propeller assembly of the second aspect, or the propeller system described above. The previously described features are applicable, as appropriate, to both the pitch change actuation system of the first aspect, the propeller assembly of the second aspect, the propeller system described above, and the method of controlling the pitch of a variable pitch propeller of the fourth aspect.

BRIEF DESCRIPTION OF THE DRAWINGS

Some exemplary embodiments of the present disclosure will now be described by way of example only and with reference to the accompanying drawings, in which.

DETAILED DESCRIPTION

Figure 1:
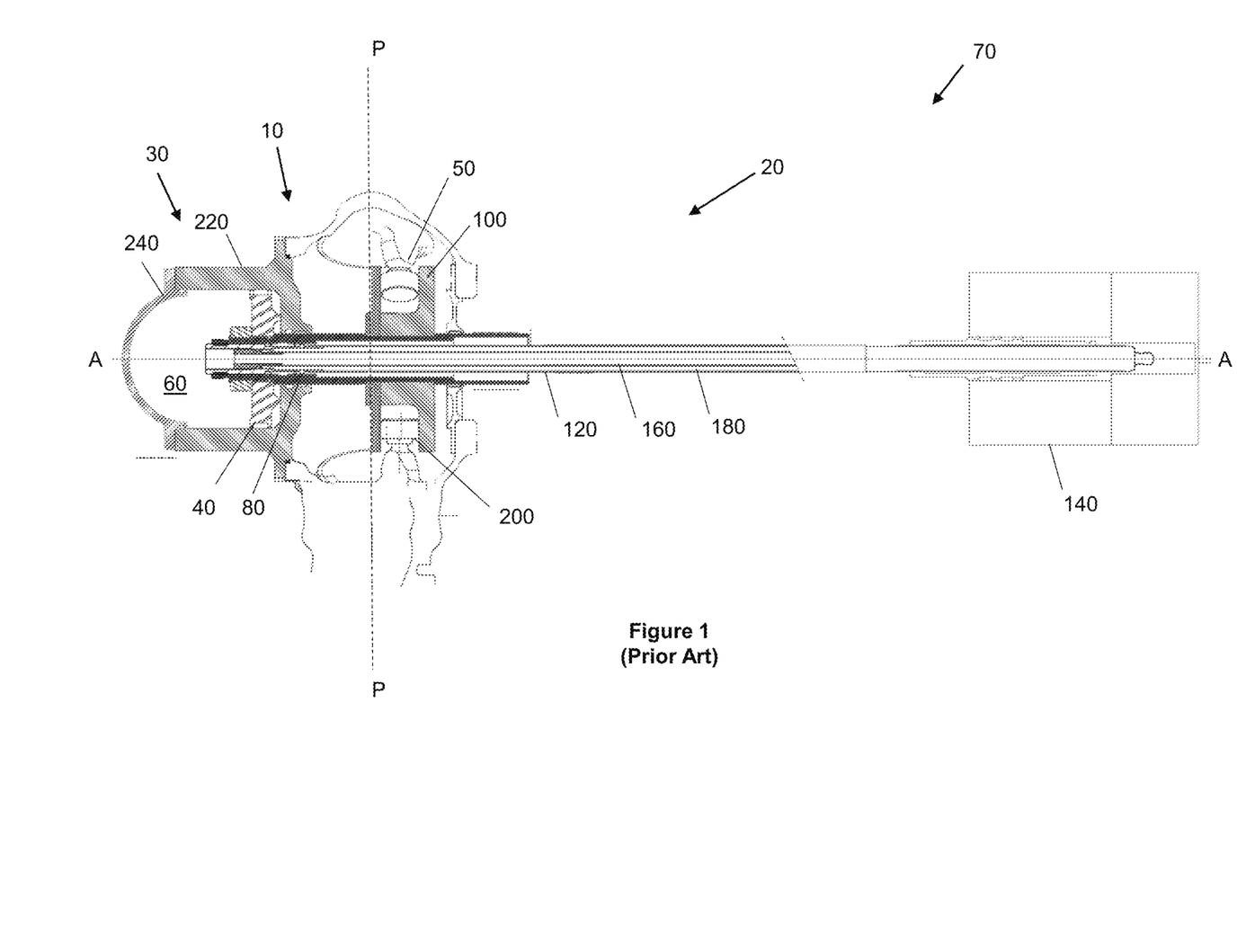
FIG. 1 shows a propeller system comprising a pitch change actuation system according to the prior art.

FIG. 1 shows a propeller system 70 comprising a propeller assembly 20 comprising a pitch change actuation system 10 according to the prior art.

A centreline (longitudinal) axis A-A of the propeller assembly 20 is shown about which components of the propeller assembly are mounted. For example, propeller blades of the propeller assembly are mounted about the axis A-A. Reference to axially forward is understood to mean along axis A-A in the direction of the left hand side of the figure and aft is understood to mean along axis A-A in the direction of the right hand side of the figure. Reference to a radial direction is understood to refer to extending perpendicularly from axis A-A, for example away from axis A-A towards the top and bottom of the figure.

The propeller assembly 20 comprising a rotary hub 30 is generally configured to rotate propeller blades to propel a vehicle, such as an aircraft, to which the propeller assembly 20 is mounted. In this example the propeller assembly 20 comprises propeller blades with variable pitch, which allows control of the angle of attack of the blade relative to the oncoming airflow. The propeller blades each have a blade root pin 50 configured to interface with a pitch change actuation system such that the angle of the blade can be adjusted. For example, the blade pitch can be adjusted from a feather position (with the blades parallel to the oncoming airflow—minimum thrust/drag) to a reverse position that may provide reverse thrust.

To adjust the pitch of the propeller blades the pitch change actuation system 10 is provided within the rotary hub 30. The pitch change actuation system 10 comprises a piston 40 located within a piston chamber 60, an actuator shaft 80 coupled to and extending from the piston 40, an actuator flange 100 extending from the actuator shaft 80, and a transfer tube 120 extending from the piston chamber 60.

The transfer tube 120 receives hydraulic fluid from a transfer tube receiving component 140 of the propeller system 70 and supplies hydraulic fluid to a first and a second side of piston 40. To supply hydraulic fluid to either side of the piston 40 the transfer tube 120 comprises two concentric hydraulic fluid passageways. The first inner hydraulic fluid passageway 160 is configured to supply hydraulic fluid from the transfer tube receiving component 140 to the first side of the piston 40. The second outer hydraulic fluid passageway 180 is configured to supply hydraulic fluid from the transfer tube receiving component 140 to the second side of the piston 40.

To vary the propeller blade pitch, a hydro-mechanical power and control assembly of the propeller system 70 in combination with the transfer tube receiving component 140 cause a pressure difference across the two sides of the piston 40 by altering the hydraulic fluid flow and pressure supplied to the first and second side of the piston 40. This causes the piston 40 to translate either axially forward or aft dependent on the pressure difference across the two sides of the piston 40. Translation of the piston 40 causes the actuator shaft 80 and the actuator flange 100 to also translate as each of the piston 40, actuator shaft 80 and actuator flange 100 are mechanically coupled to one another. The actuator flange 100 is configured to interface with a propeller blade pitch kinematic 200 which converts the translation of the actuator flange 100 into a rotational motion of a propeller blade, i.e. to change the pitch. Typically, multiple blades are provided, each with a propeller blade pitch kinematic, and the actuator flange interfaces with each propeller blade pitch kinematic.

In this example of an existing pitch change actuation system 10 the piston chamber 60 is bounded by portions of a propeller blade hub 220 and a chamber cover 240 and is located axially forward of the plane in which the propeller blades are mounted. This means that the actuator shaft 80 is required to extend from the piston 40 to the propeller blade plane (indicated by line P-P) such that translation of the piston 40 can be used to vary the propeller blade pitch at the root of the propeller blades via the actuator flange 100. The actuator shaft 80 and actuator flange 100 add weight and complexity to the pitch change actuation system 10. Furthermore, to remove the pitch change actuation system 10, for instance during regular maintenance, it is necessary to remove chamber cover 240 such that the pitch change actuation system 10 can be extracted from the propeller blade assembly 20. In this case the piston chamber is placed at risk of contaminants inadvertently being introduced which may damage or reduce the performance of the system.

Figure 2:
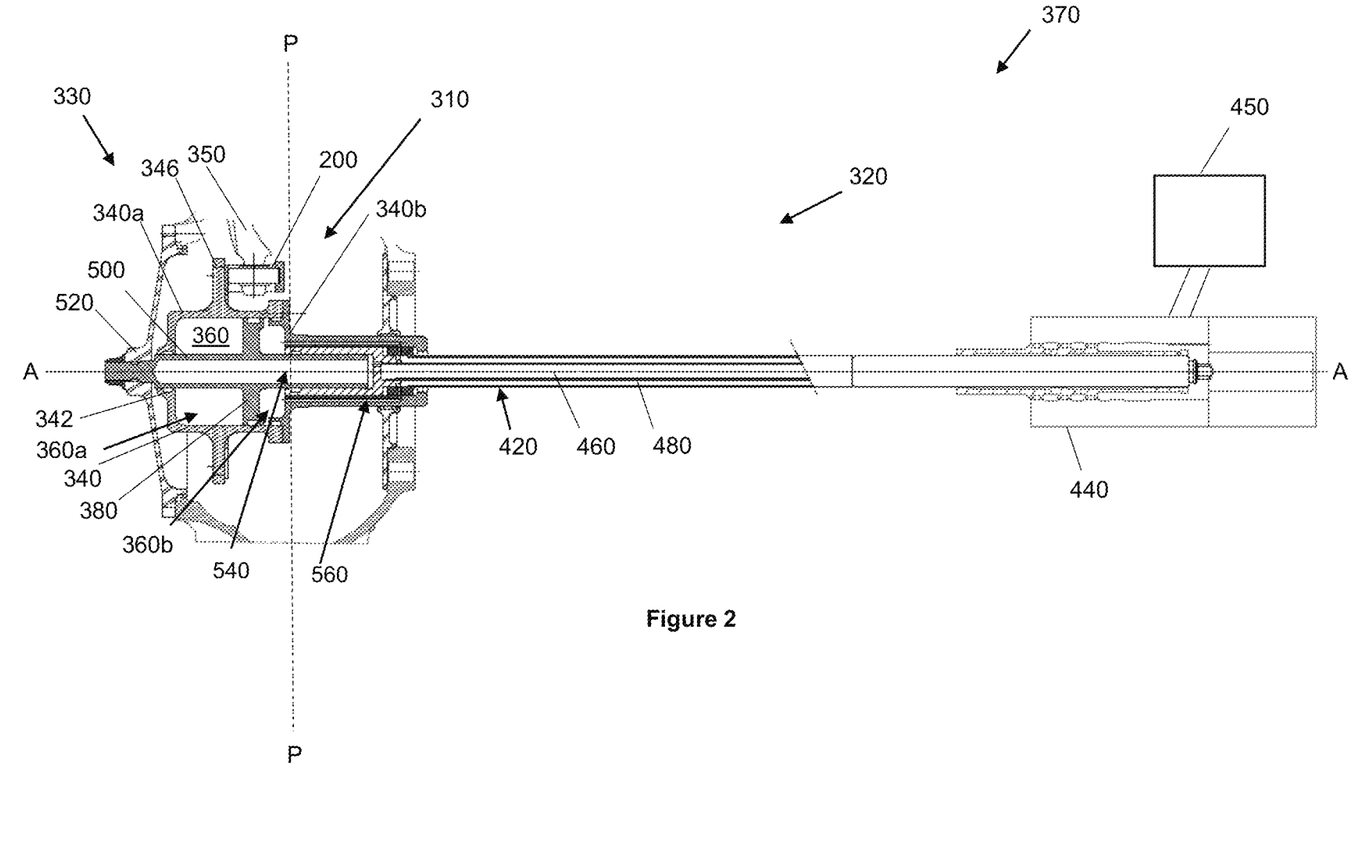
FIG. 2 shows a pitch change actuation system according to an embodiment of the present disclosure with a propeller system.

The embodiment of the present disclosure shown in FIG. 2 provides an improved pitch change actuation system 310 of a propeller assembly 320, which is part of a propeller system 370.

A centreline (longitudinal) axis A-A of the propeller assembly 320 is shown about which components of the propeller assembly are mounted. In other words, this is the axis of propeller rotation. For example, propeller blades (not visible in FIG. 2) of the propeller assembly are mounted about the axis A-A. Reference to axially forward is understood to mean along axis A-A in the direction of the left hand side of the figure and aft is understood to mean along axis A-A in the direction of the right hand side of the figure. Reference to extending radially is understood to refer to extending perpendicularly from axis A-A, for example away from axis A-A towards the top and bottom of the figure.

The propeller assembly 320 comprising a rotary hub 330 is generally configured to rotate propeller blades to propel a vehicle such as an aircraft to which the propeller assembly 320 is mounted. In this example the propeller assembly 320 comprises propeller blades with variable pitch, which allows control of the angle of attack of the blade relative to the oncoming airflow. The propeller blades each have a blade root pin 350 configured to interface with the pitch change actuation system such that the angle of the blade can be adjusted. For example, the blade pitch can be adjusted from a feather position (with the blades parallel to the oncoming airflow—minimum thrust/drag) to a reverse position that may provide reverse thrust.

To adjust the pitch of the propeller blades the pitch change actuation system 310 is provided within the rotary hub 330. The pitch change actuation system comprises: an actuator body 340 that defines an interior volume 360; a chamber separator 380 in the form of a fixed piston located within said interior volume 360, which divides the interior volume into a first chamber 360a and a second chamber 360b; and a transfer tube 420.

In this embodiment the actuator body 340 is formed of two portions, a first actuator body portion 340a and a second actuator body portion 340b. The two portions being coupled together at respective interfaces such that the first actuator body portion 340a is axially forward of the second actuator body portion 340b.

A shaft 500 extends both axially forward and aft from the chamber separator 380. In the axially forward direction the shaft 500 extends through an aperture 342 in the first actuator body portion 340a. In the axially rearward direction the shaft 500 extends into the second actuator body portion 340b. At the axially forward end of the shaft 500 the shaft 500 is mechanically coupled to a propeller hub cover 520 such that the shaft 500 and the chamber separator 380 are held axially fixed with respect to the propeller assembly 320. The actuator body portions 340a, 340b are configured to axially translate, in this case slide, along the shaft 500. In other words the actuator body 340 translates with respect to the shaft 500. In this embodiment the shaft 500 and chamber separator 380 are integrally formed as one piece.

An axially forward end of the transfer tube 420 is received within the second actuator body portion 340b at an axially aft position thereof. Hence, the transfer tube 420 is linked to the actuator body 340 and translates therewith. The second actuator body portion 340b comprises a ball joint coupling (not shown) that connects the transfer tube 420 to the actuator body 340 and prevents at least relative axial displacement between the actuator body 340 and transfer tube 420, and prevents at least relative rotation between the actuator body 340b and the transfer tube 420 about a longitudinal axis of the pitch change actuation system 310, but allows rotation about the axes perpendicular to the longitudinal axis.

An axially aft end of the transfer tube 420 is received within a transfer tube receiving component 440 of the propeller system 370. In this embodiment the transfer tube receiving component 440 is a component of a hydro-mechanical power and control assembly illustrated schematically by a box 450. However it will be appreciated that the hydro-mechanical power and control assembly can comprise multiple interconnected components located in different parts of the static part of the propeller system or aircraft to which it is mounted. The transfer tube 420 receives hydraulic fluid from the transfer tube receiving component 440 and supplies hydraulic fluid to both a fluid passageway 540 within the shaft 500 and to a fluid passageway 560 within the second actuator body portion 340b. The fluid passageway 540 within the shaft communicates the hydraulic fluid received from the transfer tube 420 to the first chamber 360a via apertures in the shaft 500 not illustrated in FIG. 2. The apertures in the shaft 500 may be axially forward of the chamber separator 380 such that the fluid passageway 540 and the first chamber 360a are in fluid communication. The fluid passageway 560 within the second actuator body portion 340b communicates the hydraulic fluid received from the transfer tube 420 to the second chamber 360b.

To supply hydraulic fluid to the fluid passageway 540 within the shaft 500 and the fluid passageway 560 within the second actuator body portion 360b the transfer tube 420 comprises two concentric hydraulic fluid passageways. In other embodiments the two hydraulic fluid passageways may be non-concentric within the transfer tube. The first inner hydraulic fluid passageway 460 is configured to supply hydraulic fluid from the transfer tube receiving component 440 to the fluid passageway 540 within the shaft 500. The second outer hydraulic fluid passageway 480 is configured to supply hydraulic fluid from the transfer tube receiving component 440 to the fluid passageway 560 within the second actuator body portion 360b.

The actuator body 340 comprises a radially extending flange 346 which is connected to a propeller blade pitch kinematic 200. The propeller blade pitch kinematic 200 is coupled to a blade tulip of the propeller blade via the blade root pin 350 and converts translation of the actuator body 340 into a rotational motion of the blade tulip. This rotational motion thereby alters the pitch of the blade. Whilst not illustrated the flange is mechanically coupled to the propeller blade pitch kinematic 200 via a fastener. Typically, multiple blades are provided, each with an associated propeller blade pitch kinematic. The flange 346 will be coupled to all the kinematics so as to effect pitch change of all blades.

The propeller system 370 comprises a sensor (not illustrated) mounted to a static portion of the propeller system 370 at an aft end of the transfer tube 420.

To vary the propeller blade pitch, the hydro-mechanical power and control assembly 450 in combination with the transfer tube receiving component 440 cause a pressure difference across the two sides of the chamber separator 380 by altering the flow and pressure of the hydraulic fluid supplied to the first and second chambers 360a, 360b via the transfer tube 420. Because the chamber separator 380 is held axially fixed, e.g. via the shaft 500 being mechanically coupled to the propeller hub cover 520, the pressure difference causes the actuator body 340 to translate axially either forward or aft along the shaft 500. The actuator body can translate between a first position axially forwardmost, and a second position axially aftmost. FIG. 2 illustrates the axially forwardmost position. The radially extending flange 346 of the actuator body 340 is configured to interface with a propeller blade pitch kinematic 200 which converts the translation of the actuator body 340 into a rotational motion of the propeller blade, i.e. pitch change. In other words, the blade tulip is connected to the moving actuator body 340 via the flange 346 of the actuator body and the kinematic 200.

The hydro-mechanical power and control assembly 450 is configured to determine the current propeller blade angle based on the axial position of the transfer tube 420 sensed by the sensor. The hydro-mechanical power and control assembly 450 is further configured to compare the current propeller blade pitch angle to a desired propeller blade pitch angle and to adjust the flow and pressures of the hydraulic fluid provided to the first and second chambers 360a, 360b accordingly. The desired blade pitch may for example be selected by the pilot or be determined automatically for example based on a desired speed of the aircraft.

In the pitch change actuation system 310 of the present embodiment, the actuator body 340 intersects the plane P-P of the propeller blades of the propeller assembly 320.

Since the actuator body 340 translates relative to the chamber separator 380, i.e. the inverse of a typical piston and cylinder arrangement, the actuator body 340 can be located within, i.e. so as to intersect, the propeller blade plane indicated by line P-P and accordingly minimal linkages are required to mechanically couple the actuator body 340 to the propeller blade pitch change kinematic 200. In other words, long and complicated shafts and flanges aren't required to extend from the component actuated by hydraulic fluid to transfer said actuation to the propeller blade pitch change kinematic. Instead, a comparably direct link can be provided between the actuator body 340 and the propeller blade pitch change kinematic 200. In addition, since the pitch change actuation system 310 intersects the blade plane, the transfer tube 420 can be shorter than in the prior art systems where the transfer tube needs to extend to the front of the propeller hub. Again, this reduces cost and complexity. Furthermore, this means that the volume of actuating fluid in the system can be reduced which in turn reduces the weight of the system.

Advantageously, the actuator body 340 being located within the blade plane (e.g. by means of the disclosed arrangement in which the actuator body translates) both reduces the weight of the pitch change actuation system 310 as well as moves the centre of gravity of the pitch change actuation system 310 to a more desirable position when compared to existing pitch change actuation systems. In other words, embodiments of the present disclosure provide a system that does not require a pitch change actuator being located axially forward of the propeller blades and hence does not require the heavy and complex linkages seen in the existing art that couple the actuator to the propeller blade kinematic. Thus, the linkage between the actuator and the propeller blade pitch kinematic in embodiments of the present disclosure (e.g. the flange 346 directly connected to the blade kinematic 200) is more compact and therefore lighter than the prior art. This offers a weight saving which is clearly advantageous in the context of aircraft, thereby reducing fuel consumption and consequently cost. Furthermore, the simpler connection utilises less parts than the prior art linkage arrangement, again resulting in reduced cost. The more compact design is also stiffer and more robust, which improves the life of the dynamic seals.

A further advantage provided by embodiments of the present disclosure includes that the pitch change actuation system 310 can be installed or uninstalled as a single module. That is the actuator body 340, chamber separator 380 and transfer tube 420 can be inserted or removed as a single module. No further rigging between the actuator body 340 and the transfer tube 420 is required. This provides for easier maintenance of a propeller assembly 320 as fewer components need to be disassembled or reassembled to install or uninstall the pitch change actuation system 310. This reduces the time required for maintenance, and therefore reduces maintenance cost. In this embodiment the pitch change actuation system 310 is a line replaceable unit, however it will be appreciated that in other embodiments the pitch change actuation system 310 may not be a line replaceable unit, whilst still being a single module.

Furthermore, as the pitch change actuation system 310 can be installed or uninstalled as a single module the first and second chambers 360a, 360b remain enclosed by the actuator body 340 during installation or uninstallation of the pitch change actuation system 310. That is, the first and second chambers 360a, 360b do not need to be exposed to the external environment during maintenance. Therefore, the risk of pollutants or contaminants entering the first and second chamber 360a, 360b from the external environment during maintenance is reduced. This has the advantage of reducing the wear to dynamic seals which can be caused by pollution in the chamber. Dynamic seals may be located between the shaft 500 and the actuator body 340 as well as between the chamber separator 380 and the actuator body 340. Thus the wear of these seals may be reduced by the pitch change actuation system 310 provided.

It can therefore be seen that the pitch change actuation system of embodiments of the disclosure offers a simplified architecture providing significant advantages over the prior art.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A pitch change actuation system for varying a propeller blade pitch, the pitch change actuation system comprising:
   an actuator body defining an interior volume; and
   a chamber separator located within the interior volume of the actuator body and dividing the interior volume into a first chamber and a second chamber, the two chambers being fluidly separated by the chamber separator;
   wherein the first and second chambers are configured to receive hydraulic fluid;
   wherein the actuator body is configured to translate relative to the chamber separator in response to a difference in hydraulic pressure between the first chamber and second chamber; and
   wherein the translation of the actuator body is configured to effect a change in propeller blade pitch;
   the pitch change actuation system further comprising:
   a transfer tube, wherein the transfer tube is coupled to the actuator body; and
   a shaft extending axially from the chamber separator and wherein the actuator body is configured to translate with respect to the shaft;
   wherein the actuator body is slidably mounted on the shaft such that the actuator body may slidably translate along the shaft with respect to the chamber separator;
   wherein a portion of the transfer tube is received within the actuator body;
   wherein the transfer tube is configured to provide hydraulic fluid to the first and second chambers;
   wherein the actuator body comprises a fluid passageway that extends from the transfer tube to the first or second chamber such that the transfer tube and the first or second chamber are in fluid communication.

2. The pitch change actuation system of claim 1, wherein the actuator body comprises an aperture at an end of the actuator body and the shaft extends through the aperture.

3. The pitch change actuation system of claim 1, wherein the shaft is configured to abut or otherwise engage with a propeller hub cover at an axially forward end of the shaft.

4. The pitch change actuation system of claim 1, wherein:
   the actuator body is configured to engage with a propeller blade pitch kinematic; the actuator body comprises a flange extending radially outwards of an outer surface of the actuator body; and
   the flange is configured for mechanically coupling the actuator body to the propeller blade pitch kinematic.

5. The pitch change actuation system of claim 1, wherein:
   the actuator body comprises a first actuator body portion and a second actuator body portion coupled together to define the interior volume; and
   the first and second actuator body portions each comprise a flange and the first actuator body portion and the second actuator body portion are fastened to one another via at least one fastener extending through the flanges of the first and second actuator body portions.

6. A pitch change actuation system for varying a propeller blade pitch, the pitch change actuation system comprising:
   an actuator body defining an interior volume; and a chamber separator located within the interior volume of the actuator body and dividing the interior volume into a first chamber and a second chamber, the two chambers being fluidly separated by the chamber separator;

wherein the first and second chambers are configured to receive hydraulic fluid;

wherein the actuator body is configured to translate relative to the chamber separator in response to a difference in hydraulic pressure between the first chamber and second chamber; and wherein the translation of the actuator body is configured to effect a change in propeller blade pitch;

pitch change actuation system further comprising:

a shaft extending axially from the chamber separator and wherein the actuator body is configured to translate with respect to the shaft;

wherein the actuator body is slidably mounted on the shaft such that the actuator body may slidably translate along the shaft with respect to the chamber separator;

wherein the pitch change actuation system further comprises:

a transfer tube, wherein the transfer tube is coupled to the actuator body, wherein a portion of the transfer tube is received within the actuator body and the transfer tube is configured to provide hydraulic fluid to the first and second chambers; and wherein the actuator body comprises a coupling that connects the transfer tube to the actuator body, wherein the coupling is configured to prevent relative axial displacement between the actuator body and transfer tube and prevent relative rotation between the actuator body and the transfer tube about a longitudinal axis of the pitch change actuation system, and allow relative rotation of the transfer tube with respect to the actuator body about axes perpendicular to the longitudinal axis.

7. The pitch change actuation system of claim 6, wherein the shaft comprises an interior fluid passageway configured to fluidly couple at least one of the first and second chambers to the transfer tube;

wherein the shaft comprises fluid outlets to provide fluid from the interior fluid passageway to at least one of the first and second chambers.

8. A propeller assembly comprising:

a propeller hub;

a propeller blade mounted to the propeller hub; and the pitch change actuation system of claim 6.

9. A propeller assembly as claimed in claim 8, wherein the actuator body intersects a plane of the propeller blade.

10. A method of controlling the propeller assembly of claim 8, the method comprising:

varying the difference in hydraulic pressure acting on either side of the chamber separator such that the actuator body enclosing the chamber separator translates relative to the chamber separator, wherein the translation of the actuator body effects a change in propeller blade pitch.

11. A method of installing a pitch change actuation system as claimed in claim 6, in a propeller assembly, comprising inserting the pitch change actuation system into a propeller hub.

12. The pitch change actuation system of claim 6, wherein the shaft comprises an interior fluid passageway configured to fluidly couple at least one of the first and second chambers to the transfer tube; and wherein the shaft comprises fluid outlets to provide fluid from the interior fluid passageway to at least one of the first and second chambers.

13. The pitch change actuation system of claim 6, wherein the actuator body comprises an aperture at an end of the actuator body and the shaft extends through the aperture.

14. The pitch change actuation system of claim 6, wherein the shaft is configured to abut or otherwise engage with a propeller hub cover at an axially forward end of the shaft.

15. The pitch change actuation system of claim 6, wherein:

the actuator body is configured to engage with a propeller blade pitch kinematic; the actuator body comprises a flange extending radially outwards of an outer surface of the actuator body; and the flange is configured for mechanically coupling the actuator body to the propeller blade pitch kinematic.

16. The pitch change actuation system of claim 6, wherein:

the actuator body comprises a first actuator body portion and a second actuator body portion coupled together to define the interior volume; and the first and second actuator body portions each comprise a flange and the first actuator body portion and the second actuator body portion are fastened to one another via at least one fastener extending through the flanges of the first and second actuator body portions.

* * * * *